United States Patent
Singh et al.

(10) Patent No.: US 12,282,422 B2
(45) Date of Patent: Apr. 22, 2025

(54) STORAGE DEVICE AND OPERATING METHOD THEREOF

(71) Applicant: SAMSUNG ELECTRONICS CO., LTD., Suwon-si (KR)

(72) Inventors: Karan Singh, Suwon-si (KR); Rajendra Singh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 262 days.

(21) Appl. No.: 17/578,678

(22) Filed: Jan. 19, 2022

(65) Prior Publication Data

US 2022/0391318 A1 Dec. 8, 2022

(30) Foreign Application Priority Data

Jun. 8, 2021 (KR) .......................... 10-2021-0074039

(51) Int. Cl.
*G06F 12/02* (2006.01)

(52) U.S. Cl.
CPC .... *G06F 12/0238* (2013.01); *G06F 2212/202* (2013.01)

(58) Field of Classification Search
CPC ............. G06F 12/0238; G06F 12/0246; G06F 12/0284; G06F 12/0292; G06F 13/42
See application file for complete search history.

(56) References Cited

U.S. PATENT DOCUMENTS

| | | | |
|---|---|---|---|
| 9,792,172 B2 | 10/2017 | Kanno | |
| 9,830,079 B2 | 11/2017 | Kanno | |
| 10,606,516 B2 | 3/2020 | Subraya | |
| 10,866,740 B2 | 12/2020 | Benisty et al. | |
| 10,866,912 B2 | 12/2020 | Hayashida et al. | |
| 2017/0060436 A1* | 3/2017 | Trika | G06F 3/0656 |
| 2017/0206104 A1* | 7/2017 | Sliwa | G06F 9/45558 |
| 2017/0286205 A1* | 10/2017 | Jeong | G06F 11/3072 |
| 2018/0321945 A1* | 11/2018 | Benisty | G06F 13/00 |
| 2019/0377516 A1* | 12/2019 | Rao | G06F 3/0683 |
| 2020/0012451 A1* | 1/2020 | Benisty | G06F 3/0679 |
| 2020/0042236 A1* | 2/2020 | Subraya | G06F 9/45533 |

(Continued)

FOREIGN PATENT DOCUMENTS

| | | |
|---|---|---|
| EP | 3605347 | 2/2020 |
| KR | 10-2017-0128012 | 11/2017 |

OTHER PUBLICATIONS

NVMe Command Submission and Completion Mechanism Jan. 2021 by Jliu9 (Year: 2021).*

(Continued)

*Primary Examiner* — Paul M Knight
(74) *Attorney, Agent, or Firm* — Morgan, Lewis & Bockius LLP

(57) ABSTRACT

Disclosed is a method of operating a storage device which includes a non-volatile memory device. The method includes informing a host that a designation functionality for designating a data criticality and a priority to namespaces of the non-volatile memory device is possible, enabling the designation functionality in response to receiving an approval of the designation functionality, receiving, from the host, a first request for designating a data criticality and a priority for a first namespace of the namespaces, and generating a namespace mapping table in response to the first request.

19 Claims, 16 Drawing Sheets

(56) References Cited

U.S. PATENT DOCUMENTS

2020/0050403 A1    2/2020  Suri et al.
2022/0413751 A1*  12/2022  Agarwal ............... G06F 3/0658

OTHER PUBLICATIONS

NVMe Base Specification May 13, 2021 (Year: 2021).*
Fuzzy Fairness Controller for NVMe SSDs 2020 by Tripathy (Year: 2020).*
NVMe Zoned Namespace Command Set Sep. 18, 2021 (Year: 2021).*

* cited by examiner

FIG. 7

NS mapping table NSMT

| NSID | Controller | Data Criticality | Priority |
|---|---|---|---|
| 1 | x | Mission Critical | Extreme |
| 2 | Controller 2 | Not Critical | Very low |
| ... | ... | ... | ... |
| k | x | Important | High |

STORAGE DEVICE AND OPERATING METHOD THEREOF

CROSS-REFERENCE TO RELATED APPLICATION

This application claims priority under 35 U.S.C. § 119 to Korean Patent Application No. 10-2021-0074039 filed on Jun. 8, 2021, in the Korean Intellectual Property Office, the disclosure of which is incorporated by reference herein in its entirety.

TECHNICAL FIELD

Embodiments of the present disclosure relate to a storage device and an operating method thereof, and more particularly, to a storage device including namespaces and an operating method thereof.

DISCUSSION OF THE RELATED ART

Volatile memory devices are memory devices that lose data stored therein when power is removed from them. Volatile memory devices include static random access memory (SRAM) and dynamic random access memory (DRAM). A non-volatile semiconductor memory retains data stored therein even when a power supply is interrupted, and includes devices such as a flash memory device.

Recently, flash memory-based solid state drives (SSD) have been increasingly used as high-capacity storage mediums. A host such as a server or personal computer using the SSD may generate various kinds of data. For example, the data may represent different types of information, such as image information, sound information, and/or alphanumeric information. The SSD may provide a namespace function for configuring a plurality of logical devices on one physical device.

SUMMARY

Embodiments of the present disclosure provide a storage device that designates a data criticality and a priority for each namespace and internally manages data and access thereof based on the designated data criticality and priority, and an operating method of the aforementioned storage device.

According to an embodiment, a method of operating a storage device including a non-volatile memory device, includes: informing a host that a designation functionality for designating data criticality and priority to namespaces of the non-volatile memory device is available, enabling the designation functionality in response to receiving approval of the designation functionality, receiving, from the host, a first request for designating a data criticality and a priority for a first namespace of the namespaces, and generating a namespace mapping table in response to the first request.

According to an embodiment, a storage device includes one or more storage controllers, a non-volatile memory device, and an admin controller. The admin controller is configured to inform a host that a designation functionality for designating a data criticality and a priority to namespaces of the non-volatile memory device is available, enable the designation functionality upon receiving approval to use the designation functionality, receive, from the host, a first request for designating a data criticality and a priority for a first namespace of the namespaces, and generate a namespace mapping table in response to the first request.

According to an embodiment, a storage device includes one or more storage controllers, a non-volatile memory device including a plurality of memory blocks partitioned into one or more domains, and an admin controller. The admin controller is configured to: inform a host that a designation functionality for designating a data criticality and a priority to namespaces of the non-volatile memory device is possible, enable the designation functionality in response to receiving an approval of the designation functionality, receive, from the host, a first request for designating a data criticality and a priority for a first namespace of the namespaces, and generate a namespace mapping table, wherein, in response to the first request, the namespace mapping table associates the first namespace with a first storage controller of the one or more storage controllers, a first data criticality, and a first priority, and wherein a first domain of the one or more domains is designated to the first data criticality.

According to an embodiment, an operating method of a storage device, where the storage device includes a non-volatile memory device including a plurality of memory blocks partitioned into one or more domains. The method includes informing a host that a designation functionality for designating a data criticality and a priority to namespaces of the non-volatile memory device is possible, enabling the designation functionality in response to an enable request of the host, receiving, from the host, a write command for first data associated with a first namespace, wherein the first namespace has a first data criticality and a first priority, and writing the first data to one of one or more memory blocks included in a first domain designated to the first data criticality from among the one or more domains, in response to the write command for the first data.

According to an embodiment, a storage device includes one or more storage controllers, an admin controller, and a non-volatile memory device including a plurality of memory blocks partitioned into one or more domains. The storage device is configured to inform a host that a designation functionality for designating a data criticality and a priority to namespaces of the non-volatile memory device is available, enable the designation functionality in response to an enable request of the host, receive, from the host, a write command for first data associated with a first namespace having a first data criticality and a first priority from among the namespaces, and write the first data to one of one or more memory blocks included in a first domain designated to the first data criticality from among the one or more domains, in response to the write command for the first data.

BRIEF DESCRIPTION OF THE FIGURES

The above and other objects and features of the present disclosure will become apparent by describing in detail embodiments thereof with reference to the accompanying drawings.

FIG. 7 illustrates a namespace mapping table, according to some embodiments of the present disclosure.

DETAILED DESCRIPTION

Figure 1:
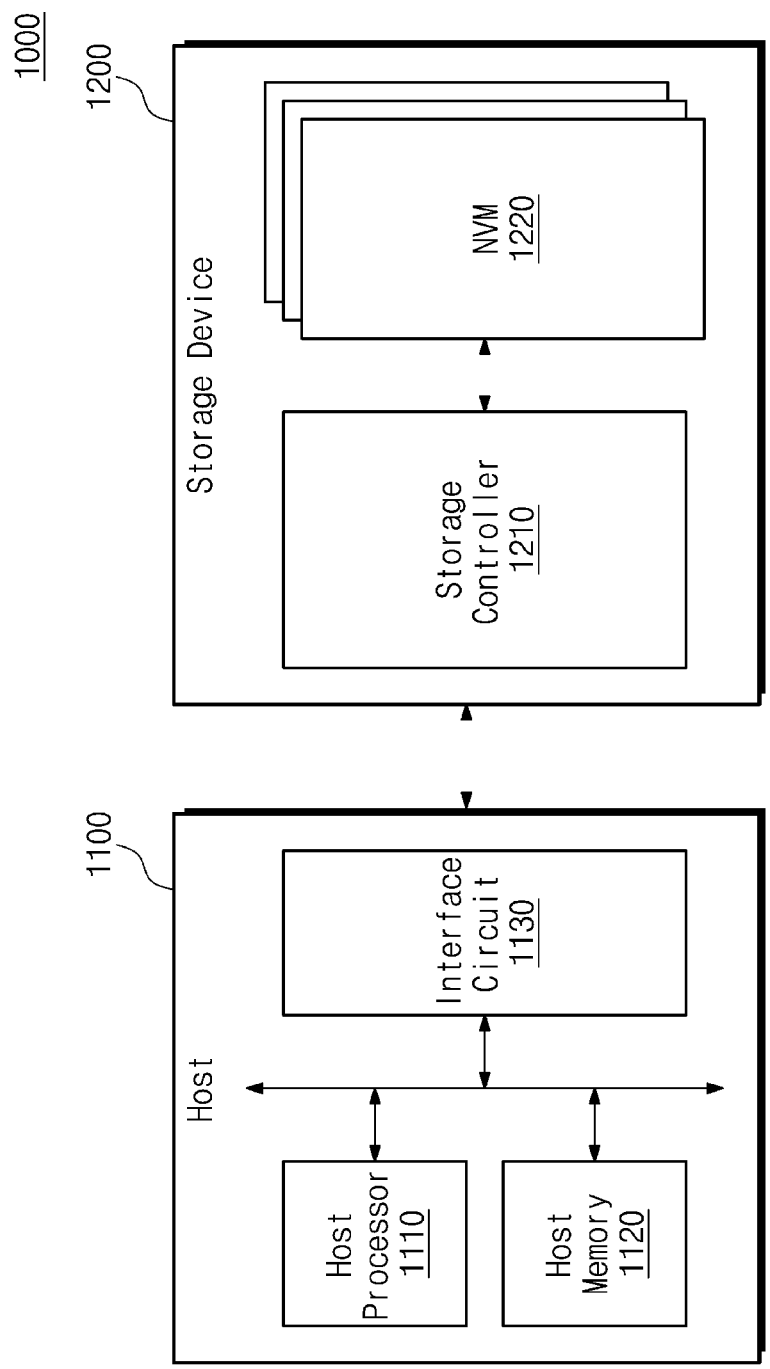
FIG. 1 illustrates a block diagram of a storage system, according to some embodiments of the present disclosure.

In some systems, such as a host computing device coupled to a storage device, data may be divided into different types through the use of namespaces. Then, the different types of data may be assigned different priorities. For example, in systems where timing is of critical importance in applications (ex. self-driving cars, medical systems, etc.), it may be desirable to assign some types of data with a higher priority than other types. For example, it may be desirable to be able to access and manipulate sensor data from radar systems over backup camera footage data. To preferentially access specific data, the host may provide information about the data to the storage device along with the data itself. The information about the data may be referred to as metadata.

Hereinafter, embodiments will be described in detail with reference to the accompanying drawings. Like reference symbols in the drawings may denote like elements, and to the extent that a description of an element has been omitted, it may be understood that the element is at least similar to corresponding elements that are described elsewhere in the specification.

FIG. 1 illustrates a block diagram of a storage system 1000, according to some embodiments of the present disclosure. Referring to FIG. 1, the storage system 1000 may include a host 1100 and a storage device 1200. In some embodiments, the storage system 1000 may an information processing device, which is configured to process a variety of information and to store the processed information, such as a personal computer (PC), a laptop, a server, a workstation, a smartphone, a tablet PC, a digital camera, and a black box.

The host 1100 may control an operation of the storage system 1000. For example, the host 1100 may send, to the storage device 1200, a request for storing data in the storage device 1200 or for reading data stored in the storage device 1200. In some embodiments, the host 1100 may include a processor core, which is configured to control the storage system 1000, such as a central processing unit (CPU) or an application processor (AP). In an embodiment, the host may be implemented with a computing node connected over a network.

The host 1100 may include a host processor 1110, a host memory 1120, and an interface circuit 1130. The host processor 1110 may manage commands from various applications, software, or virtual machines that are driven on the host 1100. The host processor 1110 may control an operation of the host 1100. For example, the host processor 1110 may control an operation for storing data (e.g., write data) of a buffer region of the host memory 1120 in the storage device 1200 or an operation for storing data (e.g., read data) of the storage device 1200 in the buffer region of the host memory 1120.

The host memory 1120 may function as a buffer memory for temporarily storing data to be sent to the storage device 1200 or for storing data received from the storage device 1200. For example, the host memory 1120 may include an administration queue, a submission queue, and a completion queue.

The administration queue may be used for managing information or command(s) needed for the host processor 1110 to control the storage device 1200. The submission queue may be used for managing a command or an input/output (I/O) to be sent to the storage device 1200. The completion queue may be used for managing information about an operation completed by the storage device 1200. In some embodiments, the administration queue, the submission queue, and the completion queue may be managed by the host processor 1110 or a storage controller 1210. In some embodiments, the submission queue and the completion queue may be a pair of queues, which may be referred to as an "input/output queue".

The interface circuit 1130 may communicate with the storage device 1200 under control of the host processor 1110. For example, based on a given protocol, the interface circuit 1130 may send, to the storage device 1200, data to be written in the storage device 1200. The interface circuit 1130 may receive, from the storage device 1200, data stored in the storage device 1200. In some embodiments, the interface circuit 1130 may communicate with the storage device 1200, based on a standard such as the PCIe (Peripheral Component Interconnect Express) or the like.

In some embodiments, the host processor 1110 and the host memory 1120 may be implemented with separate semiconductor chips. Alternatively, in some embodiments, the host processor 1110 and the host memory 1120 may be implemented in the same semiconductor chip. For example, the host processor 1110 may be one of a plurality of modules included in an application processor; in this case, the application processor may be implemented as a system on chip (SoC). In an embodiment, the host memory 1120 may be an embedded memory included in the application processor or may be a non-volatile memory or a memory module disposed outside the application processor.

The storage device 1200 may include the storage controller 1210 and a non-volatile memory device 1220. The storage controller 1210 may control an operation of the storage device 1200. For example, the storage controller 1210 may write data to the non-volatile memory device (NVM) 1220 or may read data stored in the non-volatile memory device 1220 in response to a request received from the host 1100. The storage controller 1210 may perform various operations for managing or controlling the non-volatile memory device 1220. An operation of the storage controller 1210 will be described later in detail.

The storage device 1200 may include storage mediums (e.g., the non-volatile memory device 1220) for storing data, wherein the storing operations are based on requests from the host 1100. For example, the storage device 1200 may include one or more of a solid state drive (SSD), an embedded memory, and a removable external memory. In the case where the storage device 1200 is an SSD, the storage device 1200 may comply with the NVMe (non-volatile memory express) standard. In the case where the storage device 1200 is an embedded memory or an external memory, the storage device 1200 may comply with the UFS (Universal Flash Storage) or eMMC (Embedded Multi-Media Card) standard. Each of the host 1100 and the storage device 1200 may generate data complying with a standard protocol applied thereto and may send the generated data.

When the non-volatile memory device 1220 of the storage device 1200 includes a flash memory, the flash memory may include a two-dimensional (2D) NAND flash memory array or a three-dimensional (3D) (or vertical) NAND (VNAND) memory array. For another example, the storage device 1200 may be implemented with various different non-volatile memories. For example, the storage device 1200 may include one or more of a magnetic RAM (MRAM), a spin-transfer torque MRAM (STT-MRAM), a conductive bridging RAM (CBRAM), a ferroelectric RAM (FeRAM), a phase change RAM (PRAM), a resistive RAM (RRAM), or various different memory devices.

In some embodiments, the storage device 1200 may support a namespace function. A namespace may be defined as one logical block or a set of two or more logical blocks. A logical space corresponding to the storage device 1200 may be partitioned to a plurality of namespaces. A unique logical block address (LBA) may be allocated to each namespace.

In some embodiments, in response to a request received from the host 1100, the storage device 1200 may designate a data criticality and a priority for each of a plurality of namespaces. The host 1100 may designate a criticality and a priority for each data source to the storage device 1200. For example, the host 1100 may designate a high criticality and a high priority to a data source associated with autonomous vehicles or medical devices. Additionally, the storage device 1200 may designate a criticality and a priority for data to be stored (or being stored) in a specific namespace, based on a request of the host 1100. For example, data streams that are sent to the storage device 1200 may be tagged with a criticality and a priority, and in this way to the data stream(s) may be unique to one of a plurality of namespaces. For example, a data stream that is tagged with a particular criticality and a priority may be stored in one of a plurality of namespaces.

In some embodiments, the storage device 1200 may differentiate the quality of service (QoS) between data stored in the non-volatile memory device 1220, based on a data criticality and a priority. For example, based on tag information of each of data streams, the storage device 1200 may process the data streams with different priorities.

In some embodiments, the storage device 1200 may process an input/output request associated with a specific namespace, based on a data criticality and a priority of the specific namespace. For example, the storage device 1200 may process an input/output request associated with a namespace, which is critical and has a high priority, more quickly (or with lower latency). The storage device 1200 may internally manage data of namespaces and accesses to the namespaces (or data) such that data of a critical and high priority namespace may be accessed or written with a low latency.

In some embodiments, the non-volatile memory device 1220 may include a plurality of memory blocks, and the storage device 1200 may partition the plurality of memory blocks into multiple domains. The storage device 1200 may store data associated with a namespace, which is critical and has a high priority, in a separated domain having a high reliability. Accordingly the storage device 1200 may immediately provide the host 1100 with data, which are critical and have a high priority, regardless of pending low priority input/output requests for data.

Figure 2:
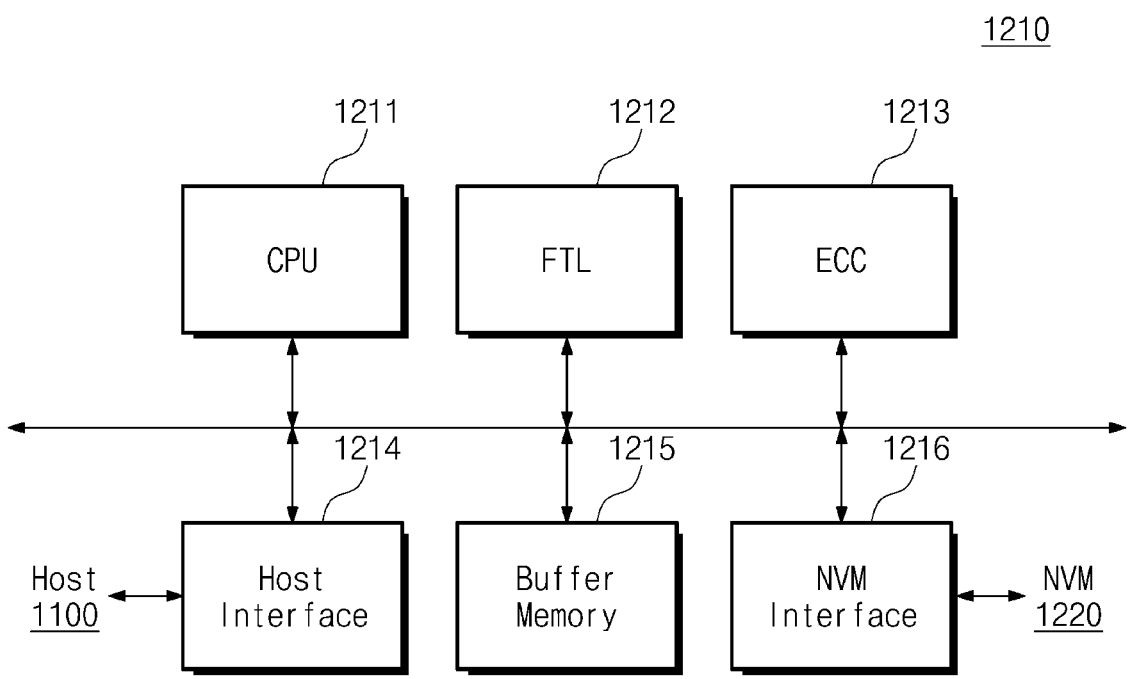
FIG. 2 illustrates a block diagram of a storage controller of FIG. 1, according to some embodiments of the present disclosure.

FIG. 2 illustrates a block diagram of the storage controller 1210 of FIG. 1, according to some embodiments of the present disclosure. Referring to FIGS. 1 and 2, the storage controller 1210 may include a CPU 1211, a flash translation layer (FTL) 1212, an error correction code (ECC) engine 1213, a host interface 1214, a buffer memory 1215, and an NVM interface 1216.

The CPU 1211 may drive an operating system, firmware, software, or a program code for the purpose of driving the storage controller 1210. The CPU 1211 may load meta data for controlling the non-volatile memory device 1220 onto the buffer memory 1215 and may refer to the loaded data. The buffer memory 1215 may include a random access memory (RAM). For example, the buffer memory 1215 may include a static RAM (SRAM) or a dynamic RAM (DRAM).

To control the non-volatile memory device 1220, the CPU 1211 may generate various commands and addresses based on requests received from the host 1100, and may generate mapping tables associated with the non-volatile memory device 1220. The CPU 1211 may send the generated commands and addresses to the NVM interface 1216. Under control of the CPU 1211, data stored in the buffer memory 1215 (or data stored in an external buffer of the storage device 1200) may be stored in the non-volatile memory device 1220 by the NVM interface 1216.

The FTL 1212 may perform various functions such as address mapping, wear-leveling, garbage collection, and namespace mapping. For example, the address mapping operation refers to an operation that translates a logical address received from the host 1100 into a physical address to be used to actually store data in the non-volatile memory device 1220. The wear-leveling may be implemented through a technology for allowing blocks in the non-volatile memory device 1220 to be used uniformly such that excessive degradation of a specific block is prevented. For example, the wear-leveling may include a firmware technology for balancing erase counts of physical blocks. The garbage collection refers to a technology for securing an available capacity of the non-volatile memory device 1220 by providing ways to erase an existing block after copying valid data of the existing block to a new block. The garbage collection may, for example, prevent memory leaks. The namespace mapping will be described later in detail.

In some embodiments, the FTL 1212 may be implemented as hardware or software. In the case where the FTL 1212 is implemented as software, a program code or information associated with the FTL 1212 may be stored (or loaded) in (or onto) the buffer memory 1215 and may be executed by the CPU 1211. When the FTL 1212 is implemented as hardware, the storage controller 1210 may further include a hardware accelerator configured to perform an operation of the FTL 1212, separately from the CPU 1211.

The ECC engine 1213 may perform error detection and correction functions on data read from the non-volatile memory device 1220. In more detail, the ECC engine 1213 may generate an error correction code (or a parity bit) with respect to data to be written to the non-volatile memory device 1220. The generated error correction code may be stored in the non-volatile memory device 1220 together with the data to be written to the non-volatile memory device 1220. In the case where data stored in the non-volatile memory device 1220 are read from the non-volatile memory device 1220, the ECC engine 1213 may detect an error of the read data based on the read data and an error correction code corresponding thereto, may correct the detected error, and may output the error-corrected read data.

The host interface 1214 may communicate with the host 1100 in compliance with a given interface protocol. In an embodiment, the given interface protocol may include protocols for various interfaces such as an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an NVMe (NVM express) interface, an IEEE 1394 interface, an USB (Universal Serial Bus) interface, an SD (Secure Digital) card interface, an MMC (Multi-Media Card) interface, an eMMC (embedded Multi-Media Card) interface, an UFS (Universal Flash Storage) interface, an eUFS (embedded Universal Flash Storage) interface, a CF (Compact Flash) card interface, or a network interface. The host interface 1214 may receive a signal, based on the given interface protocol, from the host 1100 and may operate based on the received signal. Alternatively, the host interface 1214 may send a signal, based on the given interface protocol, to the host 1100.

The buffer memory 1215 may be a write buffer or a read buffer configured to temporarily store data that is input to the storage controller 1210. Alternatively, the buffer memory 1215 may be configured to store a variety of information necessary for the storage controller 1210 to operate. For example, the buffer memory 1215 may store a mapping table (e.g., a namespace mapping table NSMT of FIG. 7) that is managed by the FTL 1212. Alternatively, the buffer memory 1215 may store software, firmware, or information that is associated with the FTL 1212.

The NVM interface 1216 may be configured to communicate with the non-volatile memory device 1220 in compliance with the given communication protocol. In some embodiments, the given interface protocol may include protocols for various interfaces such as a toggle interface and an open NAND flash interface (ONFI). In some embodiments, the NVM interface 1216 may communicate with the non-volatile memory device 1220 based on the toggle interface. In this case, the NVM interface 1216 may communicate with the non-volatile memory device 1200 through a plurality of channels. In some embodiments, each of the plurality of channels may include a plurality of signal lines configured to transfer various control signals, data signals, and a data strobe signal.

Figure 3:
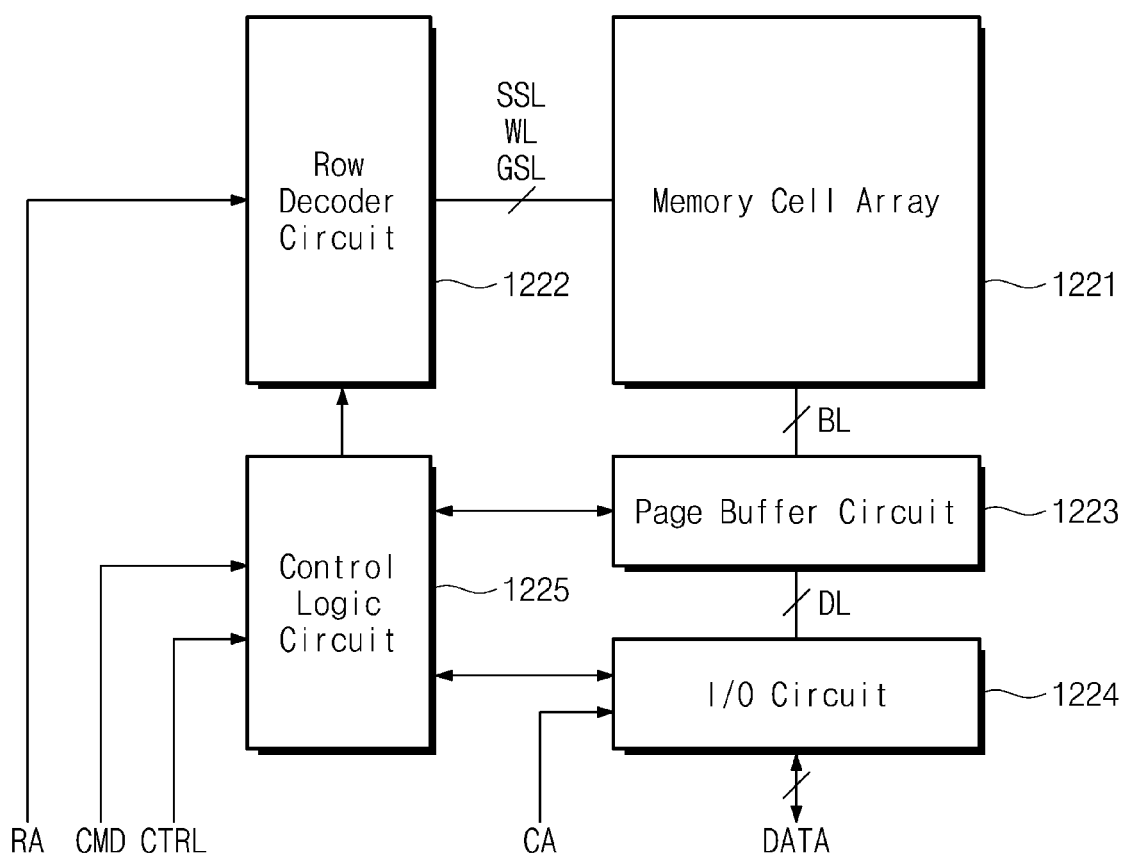
FIG. 3 illustrates a block diagram of a non-volatile memory device of FIG. 1, according to some embodiments of the present disclosure.

FIG. 3 illustrates a block diagram of the non-volatile memory device 1220 of FIG. 1, according to some embodiments of the present disclosure. Referring to FIGS. 1 and 3, the non-volatile memory device 1220 may include a memory cell array 1221, a row decoder circuit 1222, a page buffer circuit 1223, a data input/output circuit 1224, and a control logic circuit 1225.

Figure 8:
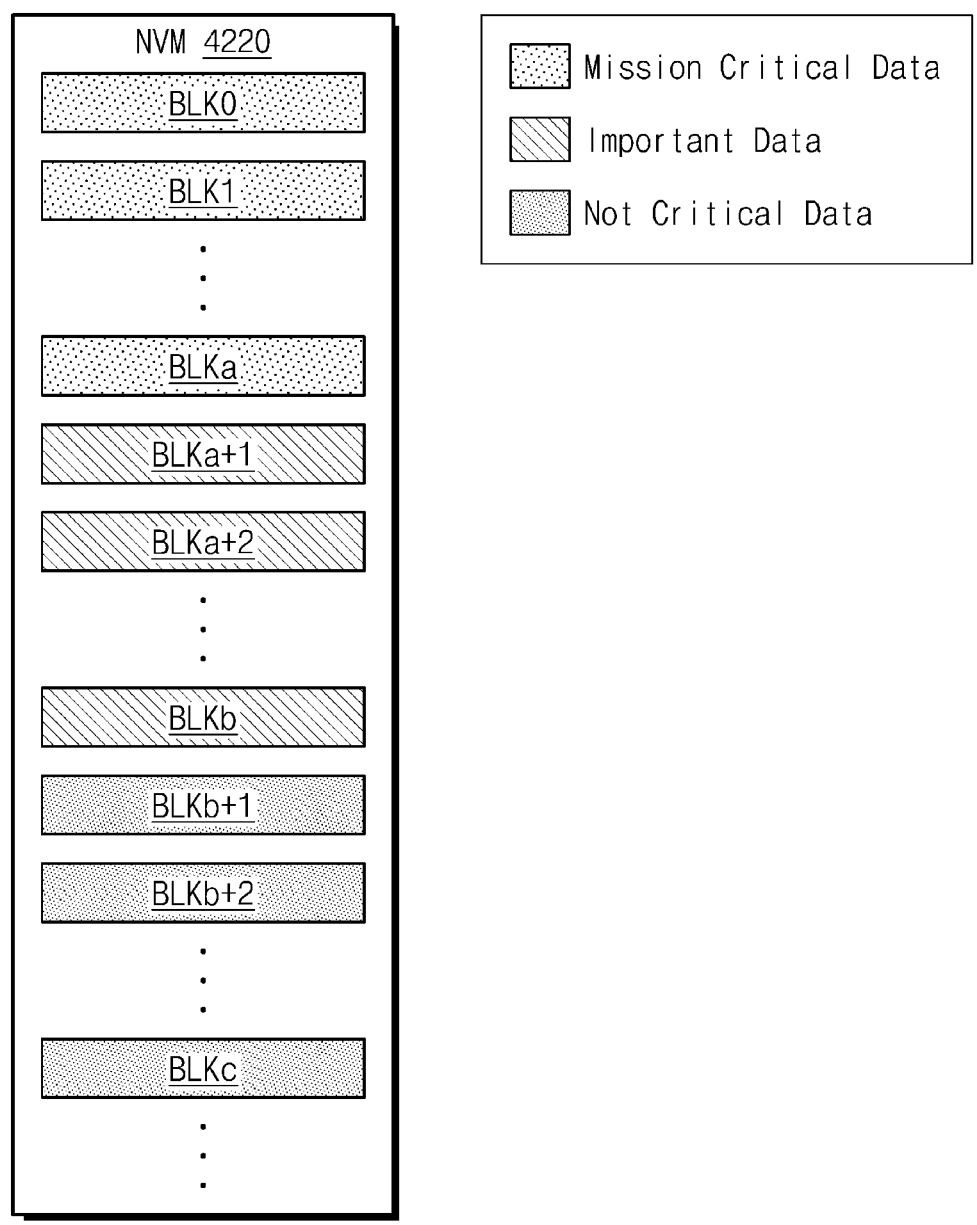
FIG. 8 illustrates memory blocks of a non-volatile memory device, according to some embodiments of the present disclosure.

The memory cell array 1221 may include a plurality of memory blocks (e.g., memory blocks BLK0 to BLKc of FIG. 8). Each of the plurality of memory blocks may include a plurality of memory cells. Each of the memory blocks may be connected with the row decoder circuit 1222 through at least one ground selection line (or multiple ground selection lines) GSL, word lines WL, and at least one string selection line (or multiple string selection lines) SSL. Each of the memory blocks may be connected with the page buffer circuit 1223 through a plurality of bit lines BL. The memory blocks may be connected in common with the plurality of bit lines BL.

The row decoder circuit 1222 may be connected to the memory cell array 1221 through the string selection lines SSL, the word lines WL, and the ground selection lines GSL. The row decoder circuit 1222 may be controlled by the control logic circuit 1225.

In an example operation, the row decoder circuit 1222 may receive a row address RA from the storage controller 1210 and may decode the received row address RA. The row decoder circuit 1222 may select one of the word lines WL connected with the memory cell array 1221 in response to the decoded row address. Under control of the control logic circuit 1225, the row decoder circuit 1222 may adjust voltages to be applied to the string selection lines SSL, the word lines WL, and the ground selection lines GSL based on the decoded row address.

The page buffer circuit 1223 may be connected with the memory cell array 1221 through the plurality of bit lines BL. The page buffer circuit 1223 may be connected with the data input/output circuit 1224 through a plurality of data lines DL. The page buffer circuit 1223 may be controlled by the control logic circuit 1225.

In a write operation, the page buffer circuit 1223 may store data to be written to the memory cell array 1221. The page buffer circuit 1223 may apply voltages to the bit lines BL based on the stored data. In a read operation or in a verification read operation associated with a write or erase operation, the page buffer circuit 1223 may sense voltages of the bit lines BL and may store a sensing result.

The data input/output circuit 1224 may be connected to the page buffer circuit 1223 through the plurality of data lines DL. The data input/output circuit 1224 may be controlled by the control logic circuit 1225. In an example operation, the data input/output circuit 1224 may receive a column address CA from the storage controller 1210. The data input/output circuit 1224 may output data corresponding to the column address CA from among data read by the page buffer circuit 1223. The data input/output circuit 1224 may transmit data "DATA" received from the storage controller 1210 to the page buffer circuit 1223 through the data lines DL, based on the column address CA.

The control logic circuit 1225 may receive a command CMD from the storage controller 1210. The control logic circuit 1225 may exchange a control signal CTRL with the storage controller 1210. The control logic circuit 1225 may decode the received command CMD. The control logic circuit 1225 may control the row decoder circuit 1222, the page buffer circuit 1223, and the data input/output circuit 1224, based on the decoded command.

Figure 4:
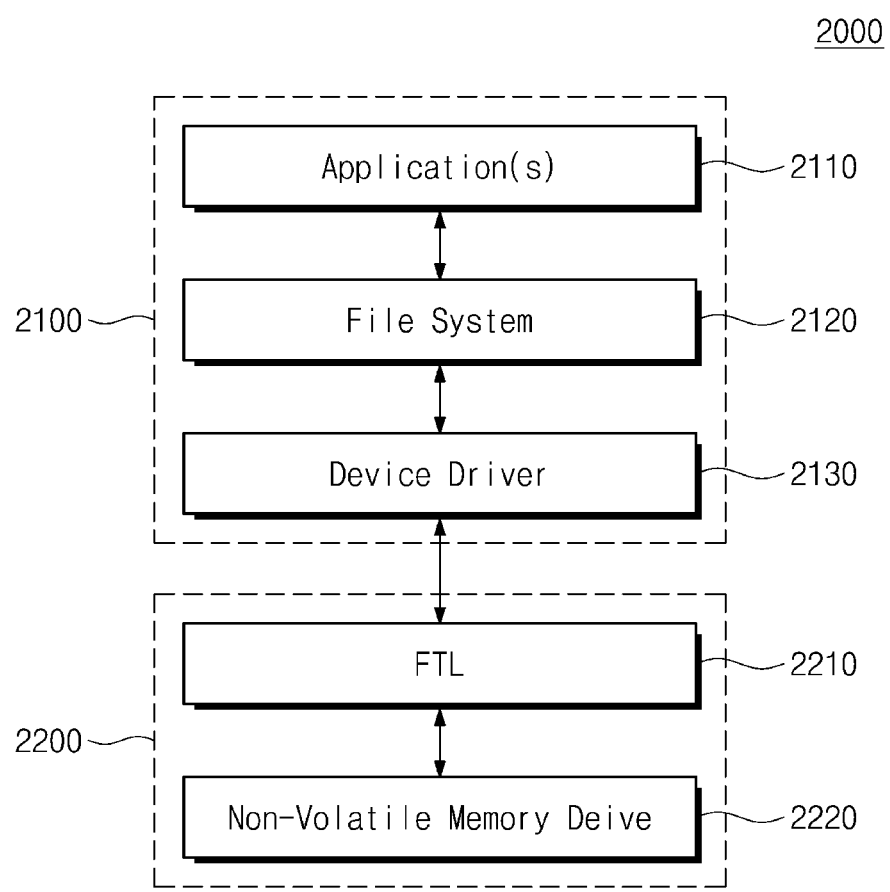
FIG. 4 illustrates software layers of a storage system, according to some embodiments of the present disclosure.

FIG. 4 illustrates software layers of a storage system 2000, according to some embodiments of the present disclosure. Referring to FIGS. 1, 2, and 4, the software layers of the storage system 1000 may include an application layer 2110, a file system layer 2120, a device driver layer 2130, and an FTL 2210. In an embodiment, the application layer 2110, the file system layer 2120, and the device driver layer 2130 may be included in a host 2100, and the FTL 2210 and a non-volatile memory device 2220 may be included in a storage device 2200.

The application layer 2110 may include various application programs (or virtual machines) that are driven in or by the host 2100. The file system layer 2120 may be configured to organize files or data that are used at the application layer 2110. For example, the file system layer 2120 may manage a storage space of the storage device 2200 as a logical block address. The file system layer 2120 may allocate a logical block address to data to be stored in the storage device 2200 and may manage the logical block address.

In some embodiments, application programs that are driven in the application layer 2110 may each generate a unique namespace when executed. Data that are written or read by each application program may be input/output in association with a unique namespace thereof. For example, one or more application programs may be implemented to share one namespace.

In some embodiments, a format of the file system layer 2120 may change depending on an operating system of the host 2100. For example, the file system layer 2120 may include one or more of various file systems such as FAT (File Allocation Table), FAT32, NTFS (NT File System), HFS (Hierarchical File System), JSF2 (Journaled File System2), XFS, ODS-5 (On-Disk Structure-5), UDF, ZFS, UFS (Unix File System), ext2, ext3, ext4, ReiserFS, Reiser4, ISO 9660, Gnome VFS, BFS, and WinFS.

The device driver layer 2130 may translate information from the file system layer 2120 or the application layer 2110 into information that is recognizable by the storage device 2200. In some embodiments, the application layer 2110, the file system layer 2120, and the device driver layer 2130 may be implemented in the form of software and may be driven on the host 2100.

The FTL 2210 may perform various maintenance operations between the host 2100 and the non-volatile memory device 2220. For example, the FTL 2210 may be configured to translate a logical block address of a request received from the host 2100 into a physical block address (or a physical address) of available memory in the non-volatile memory device 2220.

Figure 5:
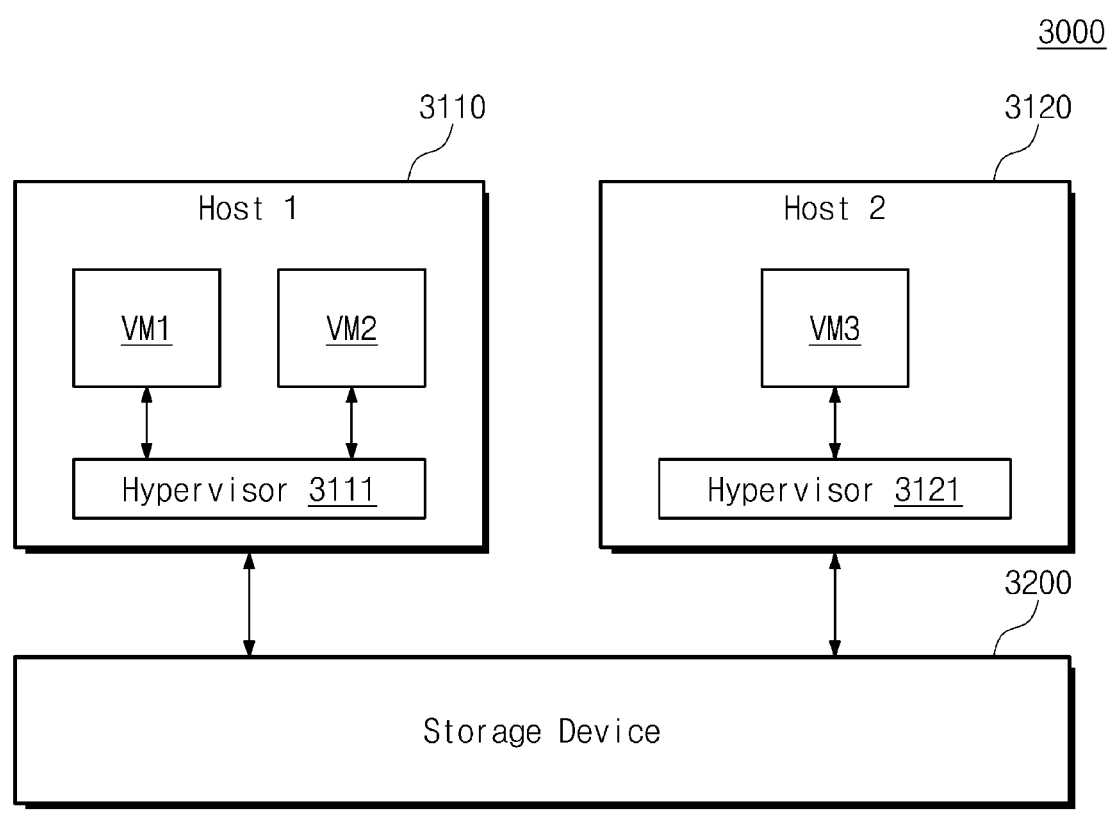
FIG. 5 illustrates a block diagram of a storage system, according to some embodiments of the present disclosure.

FIG. 5 illustrates a block diagram of a storage system 3000, according to some embodiments of the present disclosure. Referring to FIG. 5, the storage system 3000 may include a first host 3110, a second host 3120, and a storage device 3200.

A plurality of virtual machines may be driven on the first host 3110. For example, the first host 3110 may support a first virtual machine VM1 and a second virtual machine VM2. The first virtual machine VM1 and the second virtual machine VM2 may each execute an independent operating system. A hypervisor 3111 on the first host 3110 may allow the plurality of virtual machines VM1 and VM2, which are driven on the first host 3110, to access a resource of the storage system 3000. For example, the first virtual machine VM1 and the second virtual machine VM2 may access the storage device 3200 through the hypervisor 3111. In response to a request of the first virtual machine VM1 or the second virtual machine VM2, the hypervisor 3111 may send, to the storage device 3200, a request for writing data to the storage device 3200 or a request for reading data stored in the storage device 3200. In some embodiments, the hypervisor 3111 may be referred to as a "master node" or an "orchestrator".

A single virtual machine may be driven on the second host 3120. For example, the second host 3120 may support a third virtual machine VM3. The third virtual machine VM3 may access a resource of the storage system 3000 through a hypervisor 3121 on the second host 3120. For example, the third virtual machine VM3 may access the storage device 3200 through the hypervisor 3121. In response to a request of the third virtual machine VM3, the hypervisor 3121 may send, to the storage device 3200, a request for writing data to the storage device 3200 or a request for reading data stored in the storage device 3200.

Figure 6:
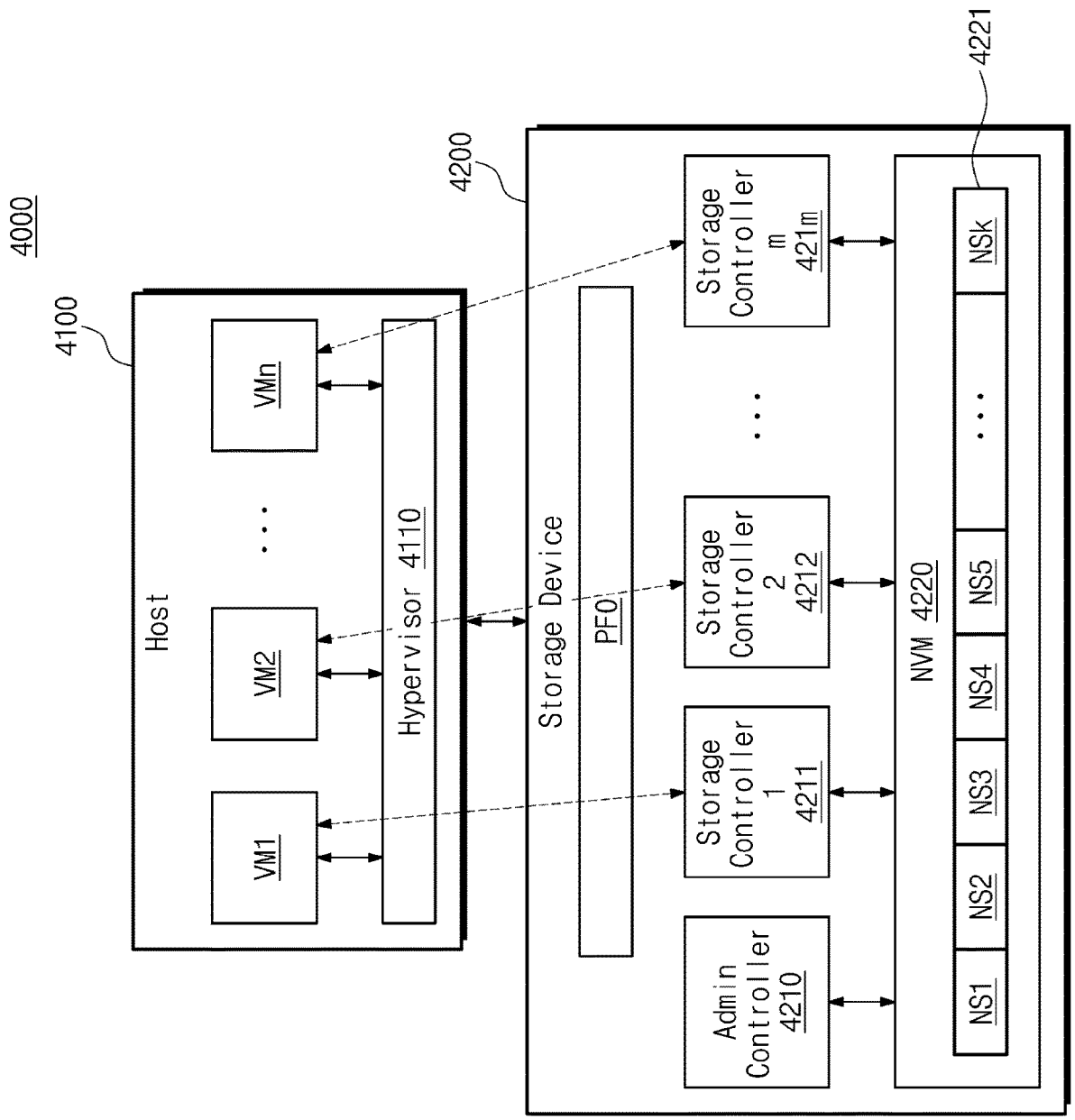
FIG. 6 illustrates a block diagram of a storage system, according to some embodiments of the present disclosure.

FIG. 6 illustrates a block diagram of a storage system 4000, according to some embodiments of the present disclosure. Referring to FIG. 6, the storage system 4000 may include a host 4100 and a storage device 4200.

The host 4100 may support a plurality of virtual machines. For example, virtual machines VM1, VM2 . . . VMn (where n is a positive integer) may be driven on the host 4100. At least one application may be driven on one virtual machine. The virtual machines VM1, VM2 . . . VMn may access the storage device 4200 through a hypervisor 4110. In response to requests of the virtual machines VM1, VM2 . . . VMn, the hypervisor 4110 may send, to the storage device 4200, requests for writing data to the storage device 4200 or requests for reading data stored in the storage device 4200.

The storage device 4200 may include an administration controller (hereinafter referred to as an "admin controller") 4210, storage controllers 4211 to 421$m$ (where m is a natural number), and a non-volatile memory device 4220. The storage device 4200 may support a physical function (PF) device PF0. A request for accessing the storage device 4200 may be provided from the host 4100 to the admin controller 4210 or the storage controllers 4211 to 421$m$ through the PF device PF0. The virtual machines VM1 to VMn that are driven on the host 4100 may share the storage device 4200, which may be a single storage, through the PF device PF0.

The admin controller 4210 may receive, from the host 4100, a request (or a command) for managing namespaces 4221 of the non-volatile memory device 4220. For example, the hypervisor 4110 of the host 4100 may send, to the admin controller 4210, a request for designating a priority for one or more of the namespaces 4221 or a criticality of data to be stored to each of the namespaces 4221. In some embodiments, the hypervisor 4110 may send the request to the admin controller 4210 through an NVMe interface or the like. In response to a request received from the hypervisor 4110, the admin controller 4210 may generate and manage a namespace mapping table (e.g., the namespace mapping table NSMT of FIG. 7). An operation of the admin controller 4210 will be described later in detail.

The storage controllers 4211 to 421$m$ may communicate with one of the virtual machines VM1 to VMn. For example, the storage controller 4211 may access the non-volatile memory device 4220 in response to a request received from the virtual machine VM1. The storage controller 4212 may access the non-volatile memory device 4220 in response to a request received from the virtual machine VM2, and the storage controller 421$m$ may access the non-volatile memory device 4220 in response to a request received from the virtual machine VMn. In some embodiments, unlike the embodiment illustrated in FIG. 6, two virtual machines may share one storage controller.

The non-volatile memory device 4220 may be divided into "k" namespaces NS1 to NSk (i.e., 4221). The namespaces 4221 may have different characteristics or requirements. For example, a reliability and/or a priority of the namespace NS1 may be different from those of the namespace NS2.

The "n" virtual machines VM1 to VMn may share the single non-volatile memory device 4220 having the "k" namespaces 4221. For example, a subset (or at least a part)

of the virtual machines VM1 to VMn may store data in a subset (or at least a part) of the namespaces 4221.

In some embodiments, a criticality or a priority of data to be written to the storage device 4200 by one virtual machine may be different from a criticality or a priority of data to be written to the storage device 4200 by another virtual machine. For example, while an application (e.g., a data streaming application or a data display application) having a relatively low priority is driven on the virtual machine VM1, an application (e.g., an autonomous driving application or a life-saving application) having a relatively high criticality or a high priority may be driven on the virtual machine VM2. In the above embodiment, a criticality or a priority of data to be written to the storage device 4200 by the virtual machine VM1 may be lower than a criticality or a priority of data to be written to the storage device 4200 by the virtual machine VM2.

In the above embodiments, in response to a request of the host 4100, the admin controller 4210 may designate a priority and a data criticality for one or more of the namespaces 4221. Depending on the priority and the data criticality designated for each of the namespaces 4221, the storage device 4200 may manage the non-volatile memory device 4220 and input/output requests (e.g., write requests or read requests) received from the virtual machines VM1 to VMn.

FIG. 7 illustrates the namespace mapping table NSMT, according to some embodiments of the present disclosure. Referring to FIGS. 6 and 7, in response to a request received from the host 4100, the admin controller 4210 may generate the namespace mapping table NSMT and may update the namespace mapping table NSMT. The host 4100 may determine a data criticality and a priority of each (or for one or more) of the namespaces 4221. For example, the host 4100 may manage data such that data which have to be read with a lower latency are stored in more important namespaces. The host 4100 may determine priorities of namespaces having the same data criticality. An input/output request for a namespace having a high priority from among the namespaces having the same data criticality may be processed more quickly.

The storage device 4200 may tag the namespaces 4221 with a data criticality and a priority by receiving a criticality and a priority of a specific namespace from the host 4100 and generating the namespace mapping table NSMT based on the received information. The storage device 4200 may access and manage data to be stored to the non-volatile memory device 4220 based on the namespace mapping table NSMT. The storage device 4200 may determine an order for handling input/output requests for the non-volatile memory device 4220 based on the namespace mapping table NSMT. For example, the storage device 4200 may generate a specified end-to-end input/output path with respect to data that are important and have a high priority. Data that are not important or data that have a low priority may share input/output queues and may be designated as not urgent.

The namespace mapping table NSMT may include information about a namespace identification NSID for an arbitrary namespace, a storage controller designated to the arbitrary namespace, and a criticality and a priority of data to be written to the arbitrary namespace (or read from the arbitrary namespace). The data criticality of the namespaces 4221 may be classified as "mission critical", "important", or "not critical", but the present disclosure is not necessarily limited thereto. The data priority of the namespaces 4221 may be classified as "extreme", "high", "low", or "very low", but the present disclosure is not necessarily limited thereto.

In some embodiments, the data criticality of the namespaces 4221 may be classified as or tagged with a data purpose, a data type, or a data-related application such as "streaming data", "display data", "business intelligence data". The storage device 4200 may determine whether to compress data of a specific type, based on the above tags provided from the host 4100. For example, the storage device 4200 may compress video data or image data and may store the compressed data in the non-volatile memory device 4220.

In some embodiments, the data criticality of the namespaces 4221 may be differentiated for each input/output request (or for each command received from the host 4100). For example, a data criticality of an arbitrary namespace may be designated so as to be "mission critical" only with respect to a read command or so as to be important only with respect to a write command. A write command for a namespace that is "mission critical" only with respect to a read command may be processed, for example, relatively slowly compared to a read request for the namespace in one configuration.

A namespace that is "mission critical" may be defined so as to have utterly important data with respect to applications driven on the host 4100, and a latency necessary to access the utterly important data may set to be minimum within a range that the storage device 4200 is capable of providing. The storage device 4200 may internally (or automatically) manage data of namespaces being "mission critical" so as to have the highest immunity from the corruption or such that retention of the data is high. For example, the storage device 4200 may store the above data in memory cells (or memory blocks) having a high reliability, may frequently perform a read refresh operation on the above data, may keep a plurality of copies of the above data, or may set an RAID to the above data. For example, the namespaces associated with "mission critical" data may be stored in memory cells (e.g., single level cells (SLC) or memory cells to which a fail-safety parity RAID is applied) having the highest reliability from among memory cells in the non-volatile memory device 4220.

The storage device 4200 may manage data of namespaces being "mission critical" so as to have the lowest latency. For example, the storage device 4200 may store the above data in memory blocks that are safe (e.g., defect-prevented) from a fail of a data input/output and are separated. For example, the above memory blocks may be memory blocks in which a frequency of an operation capable of hindering a read latency, such as a read retry operation, is reduced as a read error or the like is prevented. As such, data of namespaces being "mission critical" may have the lowest latency when applications driven on the host 4100 read the above data.

For example, in an embodiment, an example in which the namespace NS1 is not designated to a specific storage controller ("x"), data to be written to the namespace NS1 (or data written thereto) may be designated as "mission critical", and a priority of data to be written to the namespace NS1 (or data written thereto) may be "extreme" is illustrated in FIG. 7. As such, data to be written to the namespace NS1 (or data written thereto) may be stored in memory cells (e.g., single level cells (SLC) or memory cells to which a fail-safety parity RAID is applied) having the highest reliability from among memory cells of the non-volatile memory device 4220, and an input/output request for accessing the namespace NS1 may be processed more quickly compared to any other input/output requests.

An example in which the namespace NS2 is designated to the storage controller 4212 ("Controller 2"), data to be written to the namespace NS2 (or data written thereto) might be set to be not important ("Not Critical"), and a priority of data to be written to the namespace NS2 (or data written thereto) may be "very low" is illustrated in FIG. 7. As such, the namespace NS2 may be accessed only by the storage controller 4212, data to be written to the namespace NS2 (or data written thereto) may be stored in memory cells (e.g., multi-level cells (MLC) or memory cells to which a fail-safety parity RAID is not applied) having a relatively low reliability from among the memory cells of the non-volatile memory device 4220, and an input/output request for accessing the namespace NS2 may be processed more slowly compared to any other input/output requests.

FIG. 7 also illustrates an example in which the namespace NSk is not designated to a specific storage controller ("x"), data to be written to the namespace NSk (or data written thereto) may be "important", and a priority of data to be written to the namespace NSk (or data written thereto) may be "high". As such, data to be written to the namespace NSk (or data written thereto) may be stored in memory cells having a relatively high reliability from among the memory cells of the non-volatile memory device 4220, and an input/output request for accessing the namespace NSk may be processed relatively quickly compared to any other input/output requests.

FIG. 8 illustrates memory blocks BLK1 to BLKc of the non-volatile memory device 4220, according to some embodiments of the present disclosure. Referring to FIGS. 6, 7, and 8, the non-volatile memory device 4220 may include the memory blocks BLK0 to BLKc.

The memory blocks BLK0 to BLKc may be partitioned into a plurality of domains. An ID of a specific domain among the plurality of domains may be designated for mission critical data. For example, the memory blocks BLK0 to BLKa may be designated to store mission critical data. In this example, by the storage device 4200 (e.g., the FTL driven by the storage device 4200), logical block addresses corresponding to mission critical namespaces (e.g., the namespace NS1) may be mapped onto physical block addresses corresponding to a domain, for example, physical block addresses including the memory blocks BLK0 to BLKa. As such, mission critical data may be stored in a physical space that is separated from not mission critical data. As a result, interference between important data and unimportant data may be prevented. For example, unimportant data may have no influence on a latency or integrity of important data. Also, unnecessary garbage collection due to data congestion may be prevented.

In some embodiments, to support overprovisioning to a domain designated for mission critical data, the non-volatile memory device 4220 may further include free memory blocks. For example, in response to when a logical block address and write data corresponding to a mission critical namespace are received from the host 4100, the storage device 4200 may map the received logical block address onto a physical block address (PBA) of a free memory block, and not to the memory blocks BLK0 to BLKa. In another example, to perform a read refresh operation or a garbage collection operation, the storage device 4200 may migrate at least a portion of the data stored in the memory blocks BLK0 to BLKa to free memory blocks and may again map logical block addresses corresponding to the migrated data onto physical block addresses of free memory blocks.

In some embodiments, mission critical namespaces may be always cached in an internal buffer or an external buffer memory by an FTL (e.g., by an FTL driven by a corresponding storage controller). For example, the namespace mapping table NSMT of FIG. 7 may be always cached in an internal memory device or an external memory device of the storage device 4200.

In some embodiments, the storage device 4200 may apply aggressive data protecting policies to a mission critical domain (e.g., the memory blocks BLK0 to BLKa). For example, the storage device 4200 may apply various data protecting policies which provide protection from a fast read latency and block corruption to a mission critical domain.

Some domains among the plurality of domains may be designated to store important data or to store unimportant data. For example, important data and unimportant data may have a lower priority than mission critical data. For example, the memory blocks BLKa+1 to BLKb may be designated to store important data. The remaining memory blocks (e.g., the memory blocks BLKb+1 to BLKc) may be designated to store unimportant data.

In some embodiments, the storage device 4200 may dynamically change the domains of the memory blocks BLK0 to BLKc. The storage device 4200 may dynamically change a size of a mission critical domain based on the number of free memory blocks included in the mission critical domain. For example, the storage device 4200 may monitor a free physical space for storing mission critical data (e.g., periodically). For example, the storage device 4200 may monitor the number of free memory blocks included in the mission critical domain. In response to when the number of free memory blocks included in the mission critical domain is a threshold value (e.g., "0") or less, the storage device 4200 may determine that a free physical space for storing mission critical data is insufficient.

Based on a determination that the free physical space for storing mission critical data is insufficient, the storage device 4200 may reorganize (or again designate) memory blocks, which do not contain data, from among memory blocks not belonging to the mission critical domain (e.g., free blocks among the memory blocks BLKa+1 to BLKc), as (or for) a mission critical domain. For another example, based on a determination that a capacity of the non-volatile memory device 4220 is full, the storage device 4200 may perform an erase operation on at least some memory blocks among memory blocks (e.g., the memory blocks BLKa+1 to BLKc) that do not belong to the mission critical domain and may reorganize the erased memory blocks into a mission critical domain.

Figure 9:
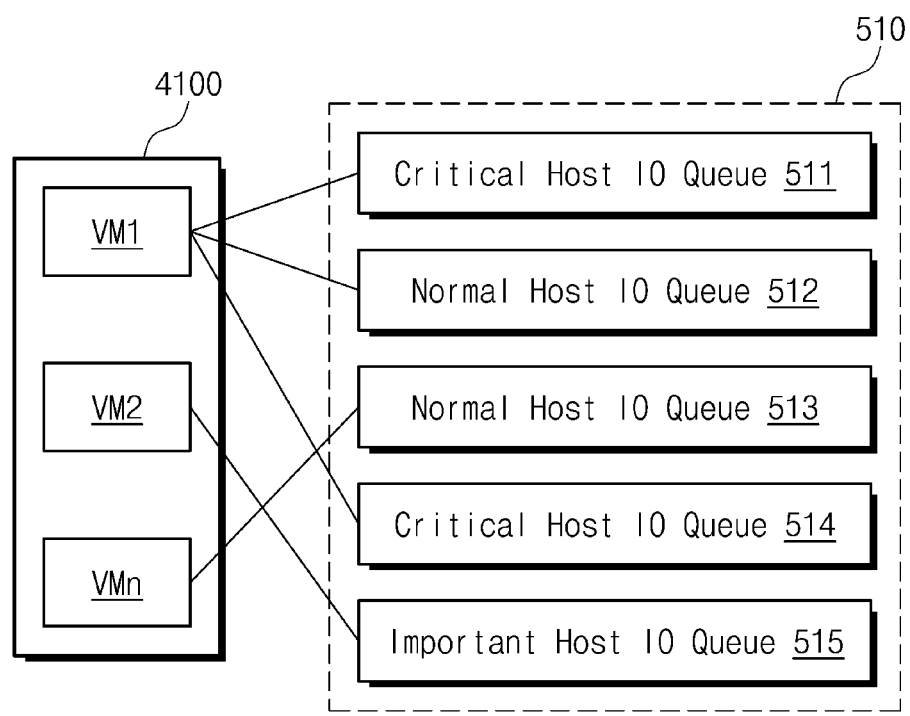
FIG. 9 illustrates input/output queues available for communication with a host, according to some embodiments of the present disclosure.

FIG. 9 illustrates a host input/output queue 510 available for communication with the host 4100, according to some embodiments of the present disclosure. Referring to FIGS. 6 to 9, the virtual machines VM1, VM2, and VM of the host 4100 may access the storage device 4200 through a corresponding input/output queue(s) among host input/output queues 510. The host input/output queues 510 may be managed by a corresponding storage controller among the storage controllers 4211 to 421m. The host input/output queues 510 may store commands received from the host 4100 and/or may include completion entries corresponding to commands received from the host 4100.

A priority of a host input/output queue(s) of each of the storage controllers 4211 to 421m may be determined based on the namespace mapping table NSMT. For example, a priority of a host input/output queue(s) of a storage controller(s) associated with (or attached to) a mission critical namespace(s) may be determined as "critical" (e.g., critical host input/output queues 511 and 514). A priority of a host input/output queue(s) of a storage controller(s) associated with a critical namespace(s) may be determined as "important" (e.g., an important host input/output queue 515). A priority of a host input/output queue(s) of a storage controller(s) associated with a namespace(s) that are not critical or important may be determined as "normal" (e.g., normal host input/output queues 512 and 513).

An order in which commands stored in the host input/output queues 510 are processed may be determined based on a priority of each of the host input/output queues 510. For example, the storage device 4200 may select an input/output queue arbitration (priority) policy such that commands and completion entries stored in critical host input/output queues (e.g., the host input/output queues 511 and 514) are processed prior to any other commands and completion entries. Accordingly, the command stored in the critical host input/output queues may be fetched by a corresponding storage controller more quickly than any other commands, and the completion entries stored in the critical host input/output queues may be posted to the host 4100 more quickly than any other entries.

In some embodiments, a command for a specific namespace may be stored in a host input/output queue of a corresponding storage controller. For example, based on the namespace mapping table NSMT of FIG. 7, a command for the namespace NS2 may be added (or enqueued) to a host input/output queue of the storage controller 4212.

In some embodiments, some namespaces might not be designated to a specific storage controller. For example, in the embodiment illustrated in FIG. 7, the namespace NS1 might not be designated to a specific storage controller. In this case, a request for accessing the namespace NS1 may be added to one of the host input/output queues 510 based on a data criticality of the namespace NS1. For example, based on that the namespace NS1 is "mission critical", a command for accessing the namespace NS1 may be added (or enqueued) to one of the critical host input/output queues 511 and 514.

In some embodiments, a specific virtual machine may designate a priority such that an input/output request thereof has a high priority. For example, the virtual machine VM1 may request the storage device 4200 that its own input/output request always has the highest priority or may set the storage device 4200 in such a way that its own input/output request always has the highest priority. Despite the above request (or configuration), the storage device 4200 may overwrite the above request (or configuration) with a priority that is based on the namespace mapping table NSMT. For example, despite the request (or configuration) of the virtual machine VM1, the storage device 4200 may determine a priority of each of the host input/output queues 510 based on a data criticality of a namespace(s) associated with a corresponding storage controller.

Figure 10:
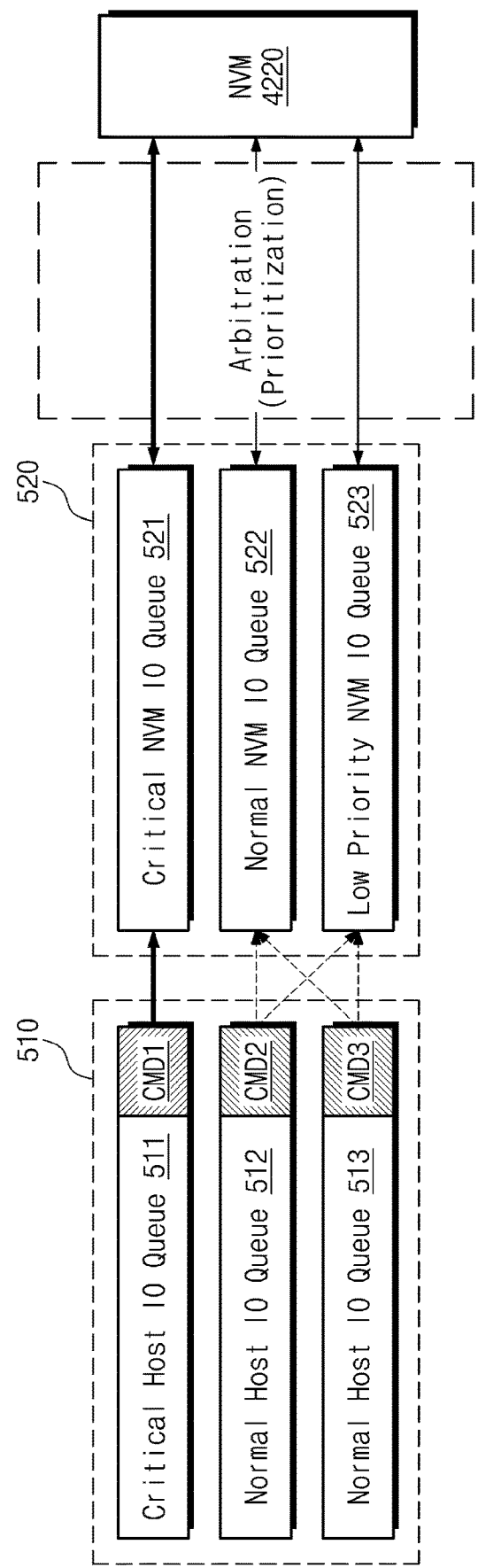
FIG. 10 illustrates input/output queues available for communication with a non-volatile memory device, according to some embodiments of the present disclosure.

FIG. 10 illustrates an NVM input/output queue 520 available for communication with the non-volatile memory device 4220, according to some embodiments of the present disclosure. Referring to FIGS. 6 to 10, commands stored in the host input/output queues 510 may be sent to one of NVM input/output queues 520.

When a corresponding storage controller fetches a command from one of the host input/output queues 510, the storage controller may check a namespace corresponding to the command from the namespace mapping table NSMT. Based on a priority of the corresponding namespace, the storage controller may add (or enqueue) an input/output request for the non-volatile memory device 4220 corresponding to the command to one of the NVM input/output queues 520.

For example, a namespace corresponding to a command CMD1 of the critical host input/output queue 511 may be "mission critical". A storage controller including the critical host input/output queue 511 may check the namespace mapping table NSMT. In response to a determination that a namespace corresponding to the command CMD1 is "mission critical", the storage controller may add (or enqueue) an input/output request corresponding to the command CMD1 to a submission queue of a critical NVM input/output queue 521 of the NVM input/output queues 520.

The storage device 4200 may process input/output requests of the NVM input/output queues 520 based on a priority of each of the NVM input/output queues 520. For example, an FTL that is driven on the storage device 4200 may select an arbitration (or prioritization) policy for the NVM input/output queues 520 such that requests of a submission queue of the critical NVM input/output queue 521 are first processed. In some embodiments, the NVM input/output queues 520 may be arbitrated based on a weighted round robin algorithm; in this case, weights of the weighted round robin algorithm may be determined based on a priority of each of the NVM input/output queues 520. The FTL driven on the storage device 4200 may access the non-volatile memory device 4220 in response to input/output requests of the NVM input/output queues 520.

An input/output request corresponding to the command CMD1 in the submission queue of the critical NVM input/output queue 521 may be processed prior to input/output queues of a normal NVM input/output queue 522 and a low priority NVM input/output queue 523. In response to the input/output request corresponding to the command CMD1, the FTL may read data from memory blocks of a mission critical domain (e.g., from the memory blocks BLK0 to BLKa) or may write data to the memory blocks of the mission critical domain. Afterwards, the FTL may add a completion entry corresponding to the command CMD1 to a completion queue of the critical NVM input/output queue 521. Completion entries of the completion queue of the critical NVM input/output queue 521 may be provided to the host 4100 with a priority that is higher than those of input/output requests of the normal NVM input/output queue 522 or the low priority NVM input/output queue 523 (e.g., prior to those of the input/output requests of the normal NVM input/output queue 522 or the low priority NVM input/output queue 523).

In the above scheme, the storage device 4200 may provide a specified input/output path with respect to data that have a high priority and are "mission critical". For example, the storage device 4200 may provide an input/output request of the host 4100, when the request is associated with data having a high priority and being "mission critical", with an input/output path including the critical host input/output queue 511 and the critical NVM input/output queue 521.

In another example, a namespace corresponding to a command CMD2 of the normal host input/output queue 512 and a namespace corresponding to a command CMD3 of the normal host input/output queue 513 may be set as important or as unimportant. A storage controller including the normal host input/output queue 512 and a storage controller including the normal host input/output queue 513 may check the namespace mapping table NSMT; in response to the determination that a namespace corresponding to the command CMD2 and a namespace corresponding to the command CMD3 are not "mission critical", the storage controllers may add (or enqueue) an input/output request corresponding to the command CMD2 and an input/output request corresponding to the command CMD3 to the normal NVM input/output queue 522 or to the low priority NVM input/output queue 523 among the NVM input/output queues 520.

In some embodiments, some namespaces may have the same data criticality. In this case, the storage device 4200 may process an input/output request for the above namespaces based on a corresponding priority of each of the above namespaces. For example, in the case where a first namespace has a mission critical data criticality and a high priority and a second namespace has a mission critical data criticality and a low priority, the storage device 4200 may process an input/output request associated with the first namespace prior to an input/output request associated with the second namespace.

In some embodiments, some namespaces may be designated only for a specific input/output command as being "mission critical". For example, a namespace may be designated only for a read command, a write command or for a part of any other input/output commands (e.g., a compare command and a data storage management (DSM) command) as being "mission critical". As such, all commands for the above namespace might not be added to a critical NVM input/output queue (e.g., 521). For example, the command CMD1 may be a write command, and a namespace corresponding to the command CMD1 may be "mission critical" only with respect to a read command. In this case, unlike the example illustrated in FIG. 10, a write request corresponding to the command CMD1 may be added (or enqueued) to a submission queue of the normal NVM input/output queue 522 or added to a submission queue of the low priority NVM input/output queue 523, and not the critical NVM input/output queue 521. Also, a completion entry corresponding to the command CMD1 may be added (or enqueued) to a completion queue of the normal NVM input/output queue 522 or added to a completion queue of the low priority NVM input/output queue 523.

Figure 11:
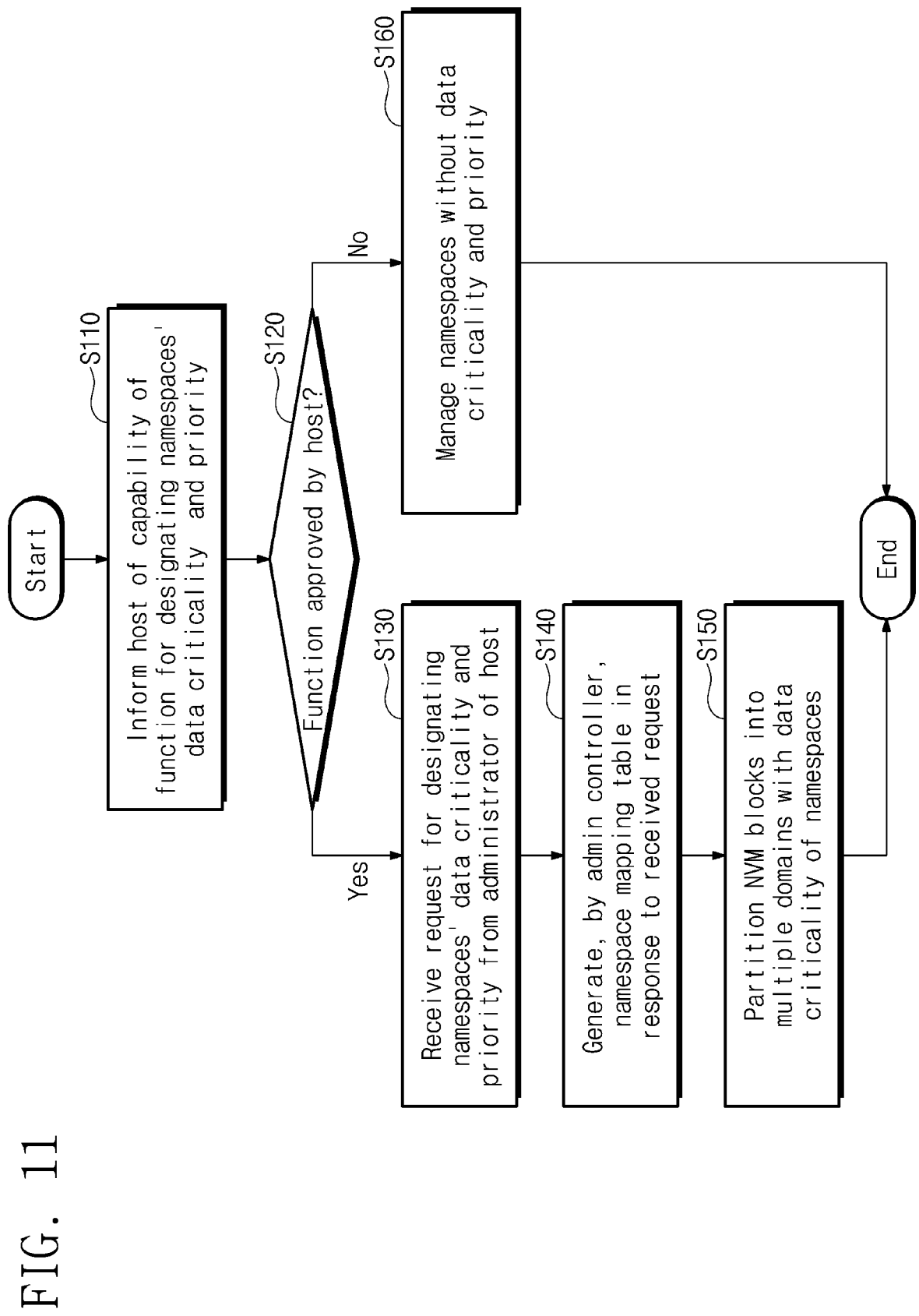
FIG. 11 illustrates a flowchart of an operating method of a storage device of FIG. 6, according to some embodiments of the present disclosure.

FIG. 11 illustrates a flowchart of an operating method of the storage device 4200 of FIG. 6, according to some embodiments of the present disclosure. Referring to FIGS. 6 to 11, the storage device 4200 may perform operation S110 to operation S160.

In operation S110, the storage device 4200 may inform the host 4100 that it is possible to perform a function for designating a data criticality and a priority with respect to each of namespaces. For example, the admin controller 4210 of the storage device 4200 may provide the host 4100 with information indicating that it is possible to designate a data criticality and a priority for each of the namespaces.

In operation S120, the storage device 4200 may determine whether the above function is approved by the host 4100. For example, in response to the information provided from the storage device 4200 in operation S110, the host 4100 may request the storage device 4200 to approve the designation functionality. The storage device 4200 may perform operation S130 in response to receiving the approval of the functionality by the host 4100. If not approved (e.g., when it is determined that the above function is not approved by the host 4100), the storage device 4200 may perform operation S160. In operation S130, the storage device 4200 may receive a request for designating a data criticality and a priority of the namespaces 4221 from an administrator of the host 4100. For example, the admin controller 4210 of the storage device 4200 may enable the above functionality. The admin controller 4210 of the storage device 4200 may receive a request for designating a data criticality and a priority of at least one of the namespaces 4221 from the hypervisor 4110 of the host 4100.

In operation S140, the storage device 4200 may generate the namespace mapping table NSMT in response to the request received in operation S110. For example, the admin controller 4210 of the storage device 4200 may generate or update the namespace mapping table NSMT, based on the request received in operation S110.

In operation S150, the storage device 4200 may partition memory blocks of the non-volatile memory device 4220 into multiple domains based on a data criticality of namespaces. For example, the storage device 4200 may partition the memory blocks based at least in part on the namespace mapping table NSMT. For example, the storage device 4200 may partition the memory blocks BLK0 to BLKc into multiple domains and may designate at least one of the multiple domains as a domain for storing mission critical data.

In operation S160, which occurs when the host 4100 does not approve the designation functionality, the storage device 4200 may manage namespaces without a data criticality and a priority. For example, the storage device 4200 may disable the above function.

Figure 13:
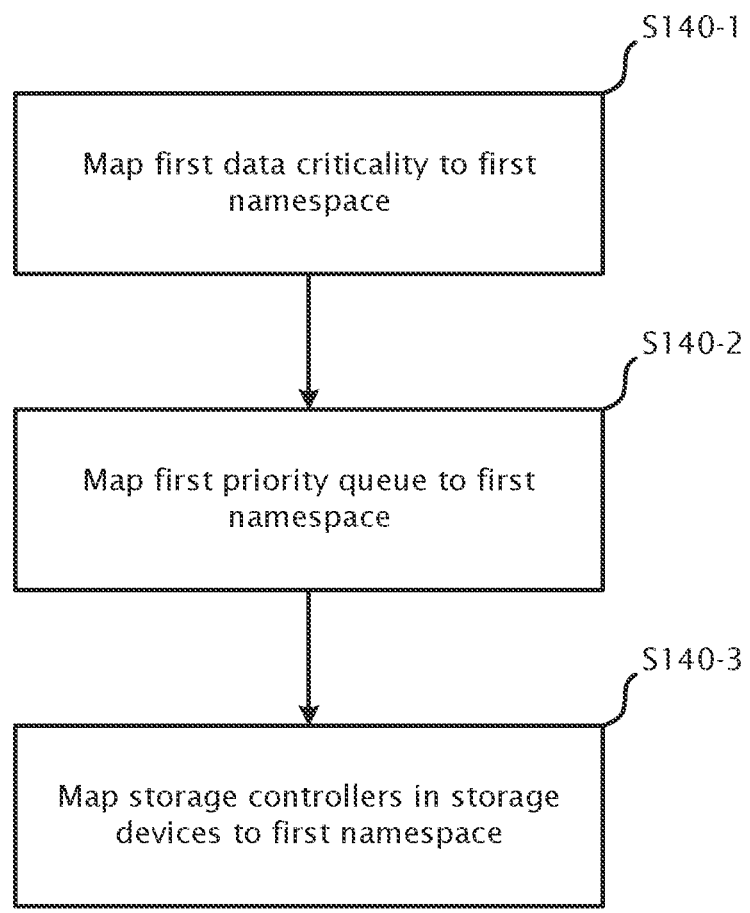
FIG. 13 illustrates a flowchart of a method of generating a namespace mapping table in the method of FIG. 11.

FIG. 13 illustrates a flowchart of a method of generating a namespace mapping table in the method of FIG. 11. As shown in FIG. 13, the method includes mapping a first data criticality to the first namespace (S140-1), mapping a first priority to the first namespace (S140-2) and mapping one of one or more storage controllers included in the storage device to the first namespace (S140-3).

Figure 12:
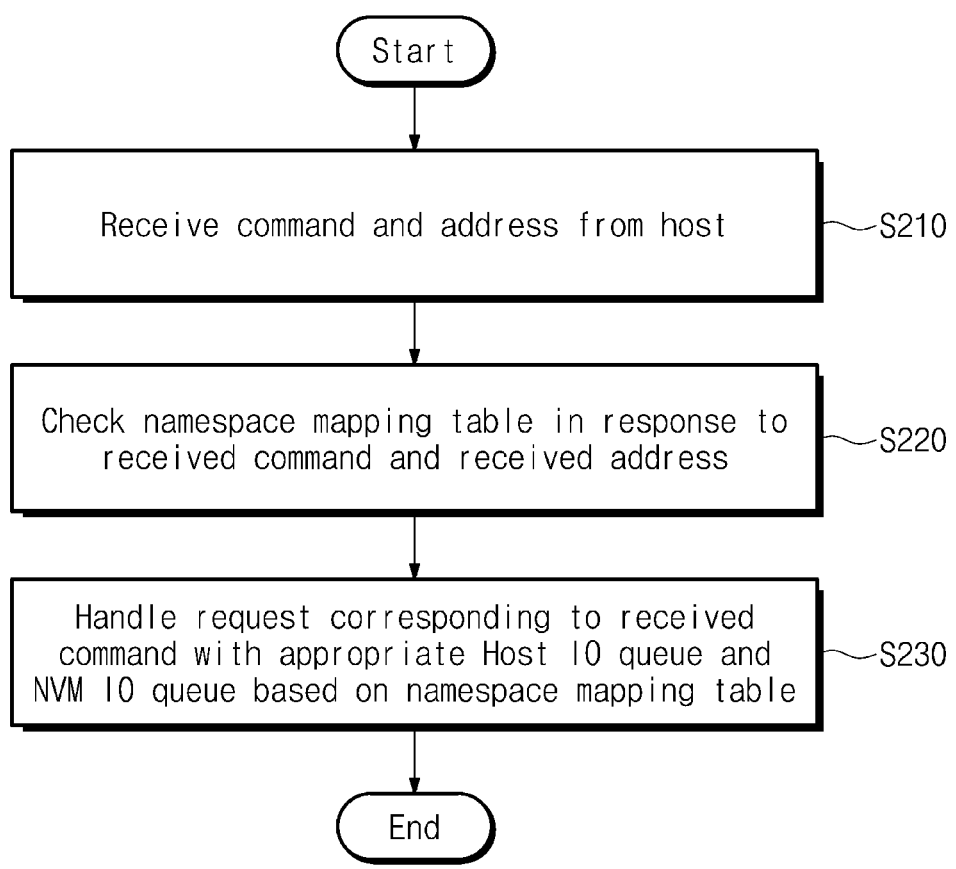
FIG. 12 illustrates a flowchart of a method in which a request received from a host of FIG. 6 is performed by a storage device of FIG. 6, according to some embodiments of the present disclosure.
Figure 14:
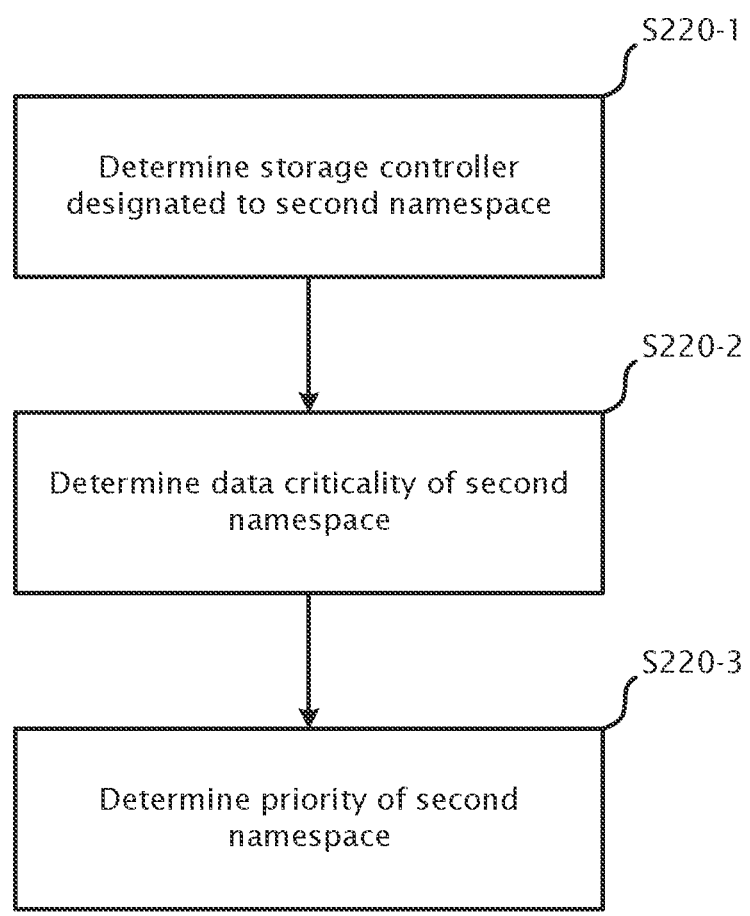
FIG. 14 illustrates a flowchart of a method of performing a lookup of a namespace mapping table and handling a read command in the method of FIG. 12.

FIG. 14 illustrates a flowchart of a method of performing a lookup of a namespace mapping table and handling a read command in the method of FIG. 12. As shown in FIG. 14, the method includes determining a storage controller that is designated to the second namespace (S220-1), determining a data criticality of the second namespace (S220-2), and determining a priority of the second namespace from the namespace mapping table (S220-3).

Figure 15:
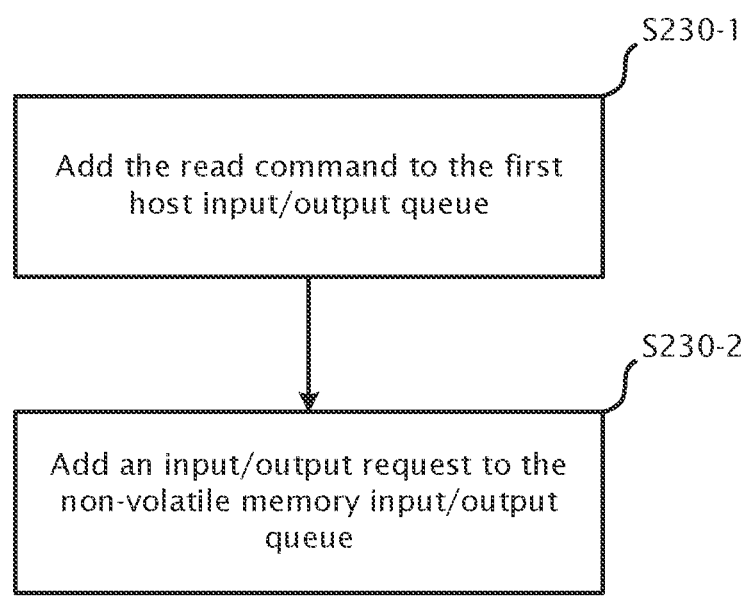
FIG. 15 illustrates a flowchart of a method handling a read command in the method of FIG. 12.

FIG. 15 illustrates a flowchart of a method handling a read command in the method of FIG. 12. As shown in FIG. 15, the method includes adding the read command to the first host input/output queue included in the first controller (S230-1) and adding an input/output request corresponding to the read command to the first non-volatile memory input/output queue (S230-2).

FIG. 12 illustrates a flowchart of a method in which a request received from the host 4100 of FIG. 6 is performed by the storage device 4200 of FIG. 6, according to some embodiments of the present disclosure. Referring to FIGS. 6 to 12, the storage device 4200 may perform operation S210 to operation S230.

In operation S210, the storage device 4200 may receive a command and an address from the host 4100. For example, the command may be a read command, a write command, a compare command, a data storage management command, or the like.

In operation S220, the storage device 4200 may check the namespace mapping table NSMT in response to the command and the address received in operation S210.

In operation S230, the storage device 4200 may handle a request corresponding to the received command with an appropriate host input/output queue and an NVM input/output queue, based on the namespace mapping table NSMT. For example, as in the above scheme described with reference to FIGS. 9 and 10, the storage device 4200 may perform operation S230.

Figure 16:
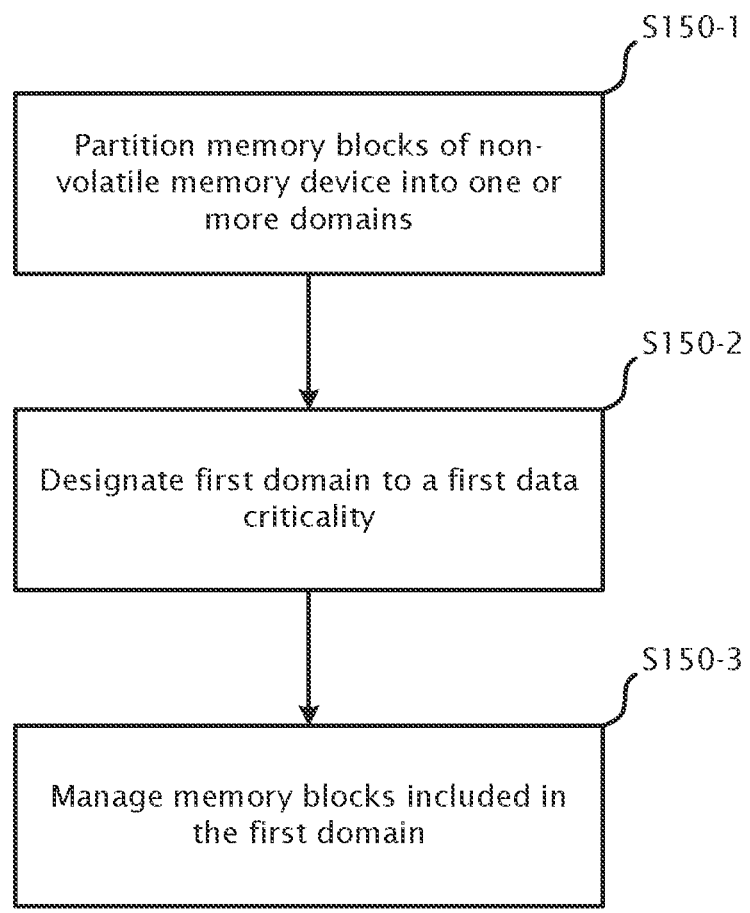
FIG. 16 illustrates a flowchart for additional steps of the method illustrated in FIG. 11.

FIG. 16 illustrates a flowchart for additional steps of the method illustrated in FIG. 11. As shown in FIG. 16, the method includes partitioning memory blocks of the non-volatile memory device into one or more domains (S150-1), designating a first domain of the one or more domains to a first data criticality (S150-2) and managing memory blocks included in the first domain (S150-3).

In some embodiments, a host-storage interface capable of designating a data criticality and a priority of each of the namespaces 4221 through an administration queue of the admin controller 4210 may be provided between the host 4100 and the storage device 4200. An arbitration policy between input/output queues (e.g., the NVM input/output queues 520) of the non-volatile memory device 4220 may be based at least in part on a criticality and a priority of namespaces attached to each of the storage controllers 4211 to 421m in the storage device 4200. The storage device 4200 may adjust an order of an input/output request based on a criticality and a priority of namespaces, thus securing an access to mission critical data under all conditions. Further, a read response time of mission critical data stored in the storage device 4200 may be improved (for example, the read response time of mission critical data stored in the storage device 4200 may be decreased).

In some embodiments, the storage device 4200 may manage input/output queues of the non-volatile memory device 4220, based on a criticality and a priority. For example, some input/output queues (e.g., the critical NVM input/output queue 521) of the non-volatile memory device 4220 may be mapped onto (or designated to) some input/output queues (e.g., the critical host input/output queues 511 and 514) for communication between the host 4100 and the storage device 4200. Accordingly an end-to-end path for managing and accessing important data may be provisioned to the host 4100.

A storage device according to some embodiments of the present disclosure may designate a data criticality and a priority for each of namespaces in response to a request from a host. The storage device may internally schedule an input/output request received from the host, based on a data criticality and a priority of each of the namespaces. Also, the storage device may store data having different data critical levels in different memory blocks. Accordingly, a low latency and a high reliability may be secured with respect to data that are important (for example, data that are designated as "mission critical") and have a high priority. As an example, "mission critical" data may include data that are integral to the systems of autonomous vehicles and medical systems, while "important" and "not important" data may be data such as backup video logs or not time sensitive data.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating a storage device, the storage device including a non-volatile memory device, and the method comprising:
providing a host with information indicating that it is possible to designate a data criticality and a priority for each of a plurality of namespaces of the non-volatile memory device, wherein the data criticality corresponds to a reliability level of memory cells for data storage and the priority corresponds to a speed at which data is processed;
receiving, from the host, a first request for designating a data criticality and a priority for a first namespace of the namespaces; and
generating a namespace mapping table in response to the first request, wherein the generating the namespace mapping table includes mapping each namespace of the namespaces of the non-volatile memory device to a data criticality, a priority, and a storage controller.

2. The method of claim 1, wherein the generating of the namespace mapping table includes:
mapping a first data criticality to the first namespace; and
mapping a first priority to the first namespace.

3. The method of claim 2, wherein the generating of the namespace mapping table further includes:
mapping one of one or more storage controllers included in the storage device to the first namespace.

4. The method of claim 1, further comprising:
receiving a read command for a second namespace from the host;
performing a lookup of the namespace mapping table; and
handling the read command with a first input/output queue and a second input/output queue communicably coupled to the first input/output queue, based on the namespace mapping table.

5. The method of claim 4, wherein the performing a lookup of the namespace mapping table includes:
determining a storage controller that is designated to the second namespace, determining a data criticality of the second namespace, and determining a priority of the second namespace from the namespace mapping table.

6. The method of claim 4,
wherein the handling of the read command with the first input/output queue and the second input/output queue based on the namespace mapping table includes:
in response to a designation of the storage controller to the second namespace as a first controller among one or more storage controllers included in the storage device, adding the read command to the first input/output queue corresponding to the first controller; and
in response to a designation of the data criticality of the second namespace being a first criticality, adding an input/output request corresponding to the read command to the second input/output queue.

7. The method of claim 6, wherein an order of processing the read command in the first input/output queue is determined based on the first criticality.

8. The method of claim 6, wherein an order of processing the input/output request corresponding to the read command, which is added to the second input/output queue, is determined based on the first criticality.

9. The method of claim 1, further comprising:
partitioning memory blocks of the non-volatile memory device into one or more domains;
designating a first domain of the one or more domains to a first data criticality; and
managing memory blocks included in the first domain.

10. The method of claim 9, wherein the first domain is configured to include memory blocks having a high reliability from among the memory blocks, when the first data criticality is designated as "mission critical".

11. A storage device comprising:
one or more storage controllers;
a non-volatile memory device; and
an admin controller distinct from the one or more storage controllers, wherein the admin controller is configured to:

provide a host with information indicating that it is possible to designate a data criticality and a priority for each of a plurality of namespaces of the non-volatile memory device, wherein the data criticality corresponds to a reliability level of memory cells for data storage and the priority corresponds to a speed at which data is processed;

receive, from the host, a first request for designating a data criticality and a priority for a first namespace of the namespaces; and generate a namespace mapping table in response to the first request, wherein the generating the namespace mapping table includes mapping each namespace of the namespaces of the non-volatile memory device to a data criticality, a priority, and a storage controller.

12. The storage device of claim 11, wherein the admin controller maps a first data criticality and a first priority to the first namespace in response to the first request.

13. The storage device of claim 12, wherein the admin controller further maps a first controller of the one or more storage controllers to the first namespace in response to the first request.

14. The storage device of claim 11, wherein the storage device is configured to:

determine a priority for a host input/output queue of each of the one or more storage controllers based on the namespace mapping table, receive a read command for a second namespace from the host, determine a storage controller designated to the second namespace from the namespace mapping table, add, in response to the determination, the read command to a host input/output queue of the first storage controller, and add, when a data criticality of the second namespace is a first criticality, an input/output request corresponding to the read command to another input/output queue communicably coupled between the host input/output queue of the first storage controller and the non-volatile memory device of the storage device.

15. The storage device of claim 14, wherein an order of processing the read command of the host input/output queue of the first storage controller is determined based on the first criticality, and wherein an order of processing the input/output request corresponding to the read command, which is added to the another input/output queue, is determined based on the first criticality.

16. A storage device comprising:
one or more storage controllers;
an admin controller distinct from the one or more storage controllers; and
a non-volatile memory device including a plurality of memory blocks partitioned into one or more domains,
wherein the storage device is configured to:
provide a host with information indicating that it is possible to designate a data criticality and a priority for each of a plurality of namespaces of the non-volatile memory device, wherein the data criticality corresponds to a reliability level of memory cells for data storage and the priority corresponds to a speed at which data is processed;

generate a namespace mapping table, wherein the generating the namespace mapping table includes mapping each namespace of the namespaces of the non-volatile memory device to a criticality, a priority, and a storage controller;

receive, from the host, a write command for first data associated with a first namespace having a first data criticality and a first priority from among the namespaces; and write the first data to one of one or more memory blocks included in a first domain designated to the first data criticality from among the one or more domains, in response to the write command for the first data.

17. The storage device of claim 16, wherein the storage device performs a lookup of the data criticality and the priority of the first namespace and a storage controller associated with the first namespace from the namespace mapping table, and wherein the namespace mapping table associates the first namespace with the one or more storage controllers, a first storage controller, the first data criticality, and the first priority.

18. The storage device of claim 16, wherein the storage device receives, from the host, a write command for second data associated with a second namespace having a second data criticality and a second priority, and writes the second data to one of one or more memory blocks included in a second domain designated to the second data criticality, in response to the write command for the second data, wherein the second data criticality and the first data criticality are different from each other, and wherein the first domain and the second domain are different from each other.

19. The storage device of claim 18, wherein the storage device receives, from the host, a write command for second data associated with a third namespace having the first data criticality and a second priority from among the namespaces, and writes the second data to one of memory blocks included in a first domain designated to the second data criticality from among the one or more domains, in response to the write command for the first data.

* * * * *